US010568340B2

United States Patent
Velez Argumedo et al.

(10) Patent No.: US 10,568,340 B2
(45) Date of Patent: Feb. 25, 2020

(54) GLAZED BAKED SNACK FOOD PRODUCTS AND GLAZE FOR SAME

(71) Applicant: The Quaker Oats Company, Chicago, IL (US)

(72) Inventors: Catalina Maria Velez Argumedo, Apodaca (MX); Sofia Leticia Fernandez Gomez, Apodaca (MX); Beatriz Elena De la Pena Lavalle, Apodaca (MX)

(73) Assignee: The Quaker Oats Company, Chicago, IL (US)

(*) Notice: Subject to any disclaimer, the term of this patent is extended or adjusted under 35 U.S.C. 154(b) by 0 days.

(21) Appl. No.: 16/444,392

(22) Filed: Jun. 18, 2019

(65) Prior Publication Data

US 2019/0297911 A1    Oct. 3, 2019

Related U.S. Application Data

(62) Division of application No. 14/684,976, filed on Apr. 13, 2015, now Pat. No. 10,368,562.

(51) Int. Cl.
  *A23G 3/34*  (2006.01)
  *A21D 13/28*  (2017.01)
  *A23P 20/00*  (2016.01)

(52) U.S. Cl.
  CPC ............ *A23G 3/343* (2013.01); *A21D 13/28* (2017.01); *A23P 20/00* (2016.08)

(58) Field of Classification Search
  None
  See application file for complete search history.

(56) References Cited

U.S. PATENT DOCUMENTS

| | | | |
|---|---|---|---|
| 2,868,647 A | 1/1959 | Vollink | |
| 3,557,717 A * | 1/1971 | Chivers | A23G 3/10 426/660 |
| 4,645,674 A | 2/1987 | Lang et al. | |
| 4,681,766 A | 7/1987 | Huzinec et al. | |
| 4,880,645 A | 11/1989 | Carpenter et al. | |
| 5,194,278 A | 3/1993 | Strong | |
| 5,840,356 A | 11/1998 | Swensen | |
| 2003/0026884 A1 | 2/2003 | Mantius | |
| 2007/0003680 A1 | 1/2007 | Tachdjian et al. | |
| 2007/0269553 A1 | 11/2007 | Le et al. | |
| 2007/0275119 A1 * | 11/2007 | Lakkis | A23G 1/325 426/3 |
| 2008/0317919 A1 | 12/2008 | Long et al. | |
| 2010/0196553 A1 | 8/2010 | Satho | |
| 2010/0196573 A1 | 8/2010 | Thelen | |
| 2013/0040018 A1 | 2/2013 | Alexandre et al. | |
| 2014/0205720 A1 | 7/2014 | Nack et al. | |
| 2014/0322405 A1 | 10/2014 | Singer, Jr. | |
| 2015/0282513 A1 | 10/2015 | Cook et al. | |

FOREIGN PATENT DOCUMENTS

| WO | 2007036957 | 4/2007 |
|---|---|---|
| WO | 2010080203 | 7/2010 |
| WO | 2014066711 | 5/2014 |

OTHER PUBLICATIONS

Beuchat, "Water Activity of Foods Table" Water Activity of Some Foods and Susceptibility to Spoilage from Microorganisms—1981 (1 page).
PCT Search Report and Written Opinion for PCT/US16/27343 dated Jul. 11, 2016 (12 pages).
PCT Search Report and Written Opinion for PCT/US16/27285 dated Jul. 15, 2016 (8 pages).
PCT International Preliminary Report on Patentability for PCT/2016/27285 completed May 26, 2017 (19 pages).
PCT International Preliminary Report on Patentability for PCT/2016/27343 completed Jun. 5, 2017 (17 pages).

* cited by examiner

*Primary Examiner* — Katherine D Leblanc
(74) *Attorney, Agent, or Firm* — Barnes & Thornburg LLP; G. Peter Nichols

(57) ABSTRACT

A sugar coating or glaze with reducing sugars greater than about 16.5% and a viscosity ranging between 170 and 650 cP is applied onto an uncooked dough product during a continuous process in the production of baked snack foods. The sugar coating has a pH of between about 1.7-3.3. The glaze maintains its form as a liquid free of solids at room temperatures despite the presence of sugars over 60% refined sugars. The glaze is applied onto a dough the glazed product is then baked, forming a glazed baked snack food product having at least 5% of a smooth, shiny glaze on a surface of the snack food product.

10 Claims, No Drawings

GLAZED BAKED SNACK FOOD PRODUCTS AND GLAZE FOR SAME

CROSS REFERENCE TO RELATED APPLICATION

This application is a divisional application of co-pending U.S. patent application Ser. No. 14/684,976, entitled "Glazed Baked Snack Food Products and Glaze for Same" filed Apr. 13, 2015, the technical disclosure of which is hereby incorporated by reference in its entirety.

BACKGROUND OF THE INVENTION

Technical Field

The present invention relates to a glaze for commercial production of snack food products and the baked snack food products coated with the glaze.

Description of Related Art

In the production of certain snack food products, it is desirable to achieve a glossy appearance while enhancing the flavor of the food product. A top coating in the form of a glaze is typically applied to a surface of a food product to obtain an appealing shine. When the glazing contains sugars, mass production of the glazed snack food product can prove difficult as there may be a tendency for crystallization or sedimentation to occur within the glazing, which can lead to clogging of equipment and production delays.

SUMMARY OF THE INVENTION

There is a need for a glaze that can be coupled with various uncooked dough products to enhance the tastes thereof and create shelf-stable food products. The glaze should provide sufficient shine and gloss, while maintaining such visual appeal even after baking. The glaze should be free of hydrocolloids and free of additives that contribute to precipitation of solids within the liquid form of the glaze.

Below is a simplified summary of this disclosure meant to provide a basic understanding of some aspects of the invention. This is not an exhaustive overview and is not intended to identify key or critical elements of the invention or to delineate the scope of the invention. Its sole purpose is to present some concepts in a simplified form as a prelude to the more detailed description below.

A liquid described herein may be used to form a coat on a surface of an uncooked dough, which is then baked, resulting in a smooth, shiny coat or glaze on the baked snack food. The coating composition or glaze is to be used on a surface of a unbaked dough piece, or one having a moisture content of between about 8% to about 20% by weight.

Generally, the glaze is an aqueous sugar coating comprising at least about 60% sugar and a juice concentrate, the sugar lacking cornstarch, and the aqueous sugar coating comprising at least about 68° Brix and greater than about 16.5% reducing sugars. The aqueous sugar coating substantially lacks solids. The aqueous sugar coating further comprises a water activity of less than about 0.9 and a pH of between about 1.7 to about 3.3. In one embodiment, the aqueous sugar coating comprises a pH of between about 2.0 and about 3.0. In one embodiment, the aqueous sugar coating comprises a pH of between about 2.1 and about 2.4. In one embodiment, the aqueous sugar coating comprises a viscosity ranging between about 170.0 to about 650 cP. In one embodiment, the aqueous sugar coating comprises a viscosity ranging between about 170.0 to about 550 cP.

Having the above attributes, the glaze remains a stable liquid that may either be immediately used to create shelf-stable, glazed snack food products with a moisture content between about 2% and about 10%, or stored at temperatures of less than about 60° F. for later usage within a recommended time of up to 72 hours.

The glaze described herein is thus suitable for continuous application onto dough products for mass (i.e., commercial) production of baked snack food products. Resulting glazed snack food products comprises between about 10-20% fruits and/or grains. Resulting ready-to-eat, glazed baked snack food products comprise at least about 5% glazing by weight on the substrate or food base, which makes up the remaining weight. Final products comprise a moisture content of between about 2-10%, a pH of between about 5.0 to about 7.0, and a hardness factor of between about 3.5 and about 8.0 kg. In one embodiment, final products comprise a pH of between about 5.5 to about 6.5. In one embodiment, final products comprise a pH of between about 5.5 and about 5.8.

Other aspects, embodiments and features of the invention will become apparent in the following written detailed description

DETAILED DESCRIPTION

As used herein, the terms "glaze" or "glazing," "aqueous sugar coating," and "sugar coating" are synonymous and are used interchangeably to refer to a liquid sugar coating for application onto an uncooked dough piece, the aqueous sugar coating comprising reducing sugars glucose and fructose but excluding (i.e. free of) all of the following: cornstarch, egg, allergens, oils, and preservatives. The glaze or aqueous sugar coating substantially lacks solids, crystals, and sedimentation. The glaze, substantially excluding solids, thus remains stable and in liquid form while lacking sugar crystallization during formation of the glaze or during application onto a dough during continuous processes, which can last for periods of up 12 hours at a rate of about 5 to 30 m/min. Thus, substantially absent solids, the glaze remains in liquid form for continuous application onto dough products.

Unless otherwise specified, all percentages, parts and ratios as used herein refer to percentage, part, or ratio by weight of the total. Unless otherwise clear from the context, all numerical values provided herein are modified by the term "about." The term "about" as used herein refers to the precise values as indicated as well as to values that are within statistical variations or measuring inaccuracies. "About" can be understood as within 0.5%, 0.1%, 0.05%, or 0.01% of the stated value. The terms "a," "an," and "the" also refer to "one or more" or "at least one" unless expressly specified otherwise. The term "salt" as employed in this disclosure refers principally to sodium chloride or common table salt.

As used herein, the term "substantially lacking" refers to the complete or nearly complete lack of extent or degree of an action, characteristic, property, state, structure, item, or result. For example, the liquid or coating "substantially lacking solids" or means that the liquid or coating either completely lacks or so nearly completely lacks solids (i.e., as close to 0% solids as possible) that the effect would the same as if it completely lacked solids. In other words a liquid "substantially lacking" or "substantially free of" solids may still actually contain solids as long as there is no measure effect thereof (i.e., a minimal amount that does not affect its form as a liquid).

An embodiment of a suitable glaze and a method for making the glaze will now be described. Generally, the method comprises the steps of sequentially combining aqueous sugar components in the following order: water, a juice concentrate, salt and then a sugar, the sugar lacking cornstarch; and dissolving the components to form an aqueous sugar coating that maintains its form as a stable liquid substantially lacking solids at room temperatures of between about 61-79° F. (about 16-26° C.). In one embodiment, the maximum amount of solids or sedimenation in the glaze that will provide and allow for its continuous application is no more than about 0.1% solids or sedimentation.

In one embodiment, the aqueous sugar components are combined in a heating apparatus. In one embodiment, the heating apparatus also comprises a mixing element. In one embodiment, the aqueous sugar components are heated while mixing until all components are dissolved but before the boiling point is reached. In one embodiment, additional components may also be added so long as the order recited above remains. Stable glaze may be applied onto a dough product at a rate of about 5 to 30 m/min, in a continuous process free of clogs or stoppage delays from the glaze.

Generally, the aqueous sugar coating comprises at least 60% sugar and a juice concentrate, the sugar lacking cornstarch, and the aqueous sugar coating comprising at least about 68° Brix and greater than about 16.5% reducing sugars. Below or lower than about 16.5% reducing sugars, undesired crystallization occurs (i.e., the formation and the presence of solids), which will clog equipment and halt continuous processes, causing the methods described herein to fail. In one embodiment, the glaze comprises greater than 18% reducing sugars. In one embodiment, the glaze comprises greater than 20% reducing sugars.

Cornstarch should be absent from the aqueous sugar coating. This is because the presence of cornstarch will lead to dissolution problems, in which the amount of time to even attempt to dissolve the solids will be doubled. Not only will this lead to longer productions times, but also the presence of cornstarch will result in the presence of undesired solids within the glaze. During testing, cornstarch-containing formulations resulted in white patches that made the solution cloudy and lacking in clarity. The starch particles of cornstarch-containing formulations thus do not sufficiently dissolve to form an aqueous sugar coating substantially excluding solids as required for the methods and glaze described herein.

In one embodiment, the aqueous sugar coating comprises water, a juice concentrate, salt, and a sugar. In one embodiment, the aqueous sugar coating comprises between about 30% to about 32% water. In one embodiment, the aqueous sugar coating comprises between about 1% to about 2% juice concentrate. In one embodiment, the aqueous sugar coating comprises between about 3% to about 4% salt. In one embodiment, the aqueous sugar coating comprises between about 54% to about 73% sugar. In one embodiment, the aqueous sugar coating comprises at least one of: about 30% to about 32% water, about 1% to about 2% juice concentrate, about 3% to about 4% salt, and about 54% to about 73% sugar. In one embodiment, the aqueous sugar coating comprises at least two of: about 30% to about 32% water, about 1% to about 2% juice concentrate, about 3% to about 4% salt, and about 54% to about 73% sugar. In one embodiment, the aqueous sugar coating comprises at least three of: about 30% to about 32% water, about 1% to about 2% juice concentrate, about 3% to about 4% salt, and about 54% to about 73% sugar. In one embodiment, the aqueous sugar coating consists of water, juice concentrate, salt, and sugar. In one embodiment, the aqueous sugar coating consists of about 30-32% water, about 1-2% of a juice concentrate, about 3-4% salt, and about 54-73% sugar. In one embodiment, the aqueous sugar coating comprises by total weight: about 31% water, about 2% juice concentrate, about 3% salt, and about 64% fine granulated sugar. The theoretically calculated ° Brix of the initial formulation is about 67.83.

In one embodiment, the sugar is a refined sugar in granulated form. Suitable sugars, for example, include reducing sugars including for example any coarse sugar or granulated sugar. In one embodiment, the sugar comprises particle sizes ranging from a maximum 2% cumulative sum retained in a US sieve #2 and a maximum 10% passing in U.S. sieve #100.

The juice concentrate is a filtered juice derived from matured and clean fruits or vegetables. It is concentrated under low temperatures and vacuum, and the essence fraction is returned until concentrate comprise about 50% of solids. In one embodiment, the juice concentrate is derived from cranberries (*Vaccinium macrocarpon*); however, any number of juice concentrates, or combination of same, or are possible. Suitable juice concentrates should comprise greater than 50% Brix, for a total solid content of 50%. In one embodiment, the juice concentrate comprises less than 3.0 pH. Cranberry juice concentrates and other suitable juice concentrates are easily obtainable by those skilled in the art from any number of sources. Table 1 contains a list of required ingredients, and example proportions, of a sample formulation of the liquid glaze described herein.

TABLE 1

| Sample Formulation of Glaze | |
|---|---|
| Component | Weight (lbs) |
| Fine Granulated Sugar | 300.03 |
| Water | 146.97 |
| Cranberry Juice Concentrate | 7.74 |
| Salt | 14.06 |
| Total | 468.80 |

After the components are selected and weighed, the components must then undergo dissolution. A suitable apparatus in which the components may be heated to a stable liquid is, for example, a steam jacket kettle. During pre-weighing of the components in preparing the glaze, a cooking kettle is prepared for the addition of the glaze components, in one embodiment, setting the vacuum to about 3.5 psi and the temperature to about 135° F. to about 145° F. To ensure sufficient and substantial dissolution, components of the glaze must be added in the following order: water, then juice concentrate, then salt and then sugar.

After combining the glaze components, the glaze components are dissolved to form the glaze or aqueous sugar coating. In one embodiment, after adding the components to an apparatus for their dissolution, the components are heating and simultaneously mixed to fully dissolve the glaze components and form a slurry. Mixing done constantly while heating is done in one embodiment until all components are completely dissolved, or until between about 68° Brix is achieved. Mixing of the components may be performed, in one embodiment, by an agitator, for which its configuration features a single anchor-type agitator frame with finger-type scrapers that carry processed material from the kettle wall into two large "V" shaped baffle plates, providing a figure 8-type blending action. In one embodiment, the mixing comprises speeds at about 60 Hz for less than about half an hour, depending on the time to reach dissolution but before reaching the boiling point. In one embodiment, when the temperature of the slurry reaches about 140° F., the vacuum is turned off for improved dissolution without attaining burning notes (which typically occurs when reaching the boiling point). In one embodiment, mixing and heating are performed for less than about 13 minutes.

By way of example, test runs for the formulation of Table 1 required mixing at 60 Hz for about 12 minutes at temperatures of between about 135° F. to about 145° F. for total dissolution. The resulting glaze formulations comprised between 68-70° Brix, a pH of between 2.1 and 2.4, a water activity Aw of about 0.75, with a viscosity ranging between about 170-220 cP. Glaze formulations were either stable at 104° F. (40° C.) for 72 hours and free of sedimentation or crystallization, or stable at 42.8° F. (6° C.) for 24 hours and absent any solids. A stable liquid glaze or aqueous sugar coating should comprise greater than about 16.5% reducing sugars. By way of example, the tested glaze was measured to comprise about 18.15% reducing sugars. In one embodiment, the glaze comprises between about 16-20% reducing sugars. In one embodiment, the glaze comprising between about 18-20% reducing sugars.

Formed glaze may then be used immediately as an aqueous sugar coating for application onto a dough product followed by baking; or stored (preferably at temperatures below about 60° F. (about 15.6° C.). During application, as disclosed above, a solid or crystallized element is absent from the aqueous sugar coating, and therefore the production process will remain continuous and steady, free of clogging or equipment stoppage, allowing for a fully continuous, high speed method.

The following example demonstrates the effectiveness of one embodiment of the instant invention and are for illustrative purposes only. Accordingly, the following example should not be deemed limiting unless otherwise specified in the claims.

Example Glaze.

A glaze formulation was made as described above containing 32 kilograms of refined sugar, 15.675 kilograms water, 0.825 kilograms cranberry juice concentrate, and 1.5 kilograms salt for a total of 50 kilograms. The components were mixed and heated to achieve a target of 68° Brix using a kettle set at 140° F. Brix was measured every four minutes until the total dissolution was obtained within about 12 minutes. The glaze obtained had a bright color free of sedimentation. Viscosity of the solution was measured to be 196.13 cP with 68.99° Brix and a pH of about 2.25. Using a stability test in which the glaze was stored within iron drums below 60° F. for 10 days, the glaze remained stable, lacking any sedimentation of sugars.

Having formed a stable glaze, and after any desired optional storing steps, the glaze can then be used for application onto an uncooked dough product. By way of example, suitable doughs include laminated, rotary, coextruded, and short doughs. In one embodiment, the dough used may be for the formation of rotary molded biscuits, as in the example provided below. Components of the dough are first mixed to form the dough, which may then be fed into a rotary molding machine to form and cut the dough into snack-sized pieces. Both wet and dry components may be used in forming a suitable dough. By way of example, wet ingredients may include any of: flavor, oil, emulsifiers, sugars, honey, cinnamon, soy, and butter. Dry ingredients such as oats, flours, fibers, calcium, sodium bicarbonate, and inclusions such as fruits, nuts, seeds, sugars, salts, *quinoa*, raisins, and cinnamon may also be added to form a biscuit dough. Water or flavored water may also be used to form the correct consistency or moisture content for uncooked base dough piece onto which the glazing may be added. Table 2 below provides suitable formulations of a dough. The example formulations should not deemed limiting unless otherwise specified in the claims.

TABLE 2

Sample formulation of a dough.

| Dough component | % by weight |
| --- | --- |
| Brown sugar | 11-11.3 |
| Soy lecithin | 0.4-0.5 |
| Oil | 7.0-7.4 |
| Flavors (cinnamon, honey, butter, etc.) | 2.5-4.0 |
| salt | 0.3-0.4 |
| Water | 7.0.-9.2 |
| Flour (oat, whole wheat, etc.) | 24.5-25.3 |
| Oats | 12.6-12.9 |
| Grains and/or seeds | 3.5-7 |
| Fibers | 6.3-6.6 |
| Inclusions (fruits & nuts) | 13.2-16.5 |
| Leavening agents | 0.6-0.7 |

One skilled in the art armed with this disclosure will recognize that the formation of the dough can be performed by any means known in the art, including without limitation rotary molding equipment known in the art. By way of example, processing conditions are described herein using commercial production methods. During test runs, mixing of the wet and dry components for formation of the dough was performed by mixing all components at 40 rpm for about 8 minutes. The temperature of the dough during mixing was approximately 68° F. (20° C.) to 72° F. (about 22.2° C.). The formed dough was then formed at a velocity of about 1.6 m/min. The above components and conditions are provided by way of example. One skilled in the art having read this disclosure will be able to form any number of suitable doughs for the application of this glaze in a continuous process.

After manufacturing a suitable dough, the dough may be formed (i.e., cut, molded, or shaped) into desirable snack-sized pieces. Once formed into desired shapes, the glaze may be applied onto the surface of the dough shapes by disc spraying, for example. In one embodiment, the glazing application is performed in a continuous manner for high speed manufacturing of baked glazed snack food products. While the glaze will remain stable in liquid form at room temperatures, it may be desirable to apply the glaze at temperatures above room temperature, for example at temperatures of about 86° F. (30° C.) or within equipment that is temperature controlled above room temperature, to account for and avoid any negative effects caused by outdoor temperatures. Following application, the glazed dough products are baked. In one embodiment, baking of a glazed dough piece occurs within about 15 minutes and less than about 375° F. (about 190.6° C.). In one embodiment, the heating during baking peaks in the middle of the baking process before decreasing back down by about 55° F. (about 12.8° C.). Baked glazed products are then stacked and packaged. The resulting glazed snack food products is both visually appealing (with a smooth, shiny coating or glaze) and tasty while lacking any and all of: non-natural additives, eggs, allergens, and oils.

The following example demonstrates the effectiveness of one embodiment of the instant invention and are for illustrative purposes only. Accordingly, the following example should not be deemed limiting unless otherwise specified in the claims.

Example Application and Baking.

During one test run, by way of example, glaze having a measured viscosity of about 320 cP at room temperature of about 77° F. was added onto formed dough pieces by way of disc spraying. The glazed dough pieces then proceeded along to a multi-zone oven by way of a conveyor, where the uncooked pieces were baked for about 14 minutes within three zones. Zones 1 and 2 utilized conduction and convection heat while zone 3 used only convection heat. Heating within the zones of the oven increased and peaked within zone 2, with zone 1 heated to about 338° F. (170° C.), zone 2 at about 374° F. (190° C.), and zone 3 decreasing back down to 320° F. (160° C.).

The final glazed baked food product comprises grain and is coated on at least one surface with a sugar coating comprising a juice concentrate and at least 60% sugar, which is free of cornstarch. The final glazed baked food product further comprises a moisture content of between about 2-10%. In one embodiment, the final glazed baked food product further comprises a moisture content of between about 2-3.5%. In one embodiment, the baked food product comprises at least about 5% sugar coating (i.e., glaze) on a top surface. In one embodiment, the baked food product comprises about 5% sugar coating (i.e., glaze) on a surface. The glazed baked food product is ready-to-eat, with a smooth and shiny glazing.

In one embodiment, the glazed baked food product comprises a pH of between about 5 to about 7. In one embodiment, the glazed baked food product comprises a pH of between about 5.5 to about 6.5. In one embodiment, the glazed baked food product comprises a pH of between about 5.5 to about 5.8.

In one embodiment, the glazed baked food product comprises a hardness factor of between about 3.5 and about 8.0 kg. In one embodiment, the glazed baked food product comprises a hardness factor of between about 4 and about 7.5 kg. In one embodiment, the glazed baked food product comprises a hardness factor of between about 4.1 and about 7.3 kg.

The invention illustratively disclosed herein suitably may be practiced in the absence of any element or limitation not specifically disclosed herein. The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims. Moreover, any combination of the above-described elements in all possible variations thereof is encompassed by the invention unless otherwise indicated herein or otherwise clearly contradicted by context.

ADDITIONAL DESCRIPTION

The following clauses are offered as further description of the disclosed invention.

1. An aqueous sugar coating comprising at least 60% sugar and a juice concentrate, said sugar lacking cornstarch, wherein said aqueous sugar coating comprises at least 68° Brix and greater than about 16.5% reducing sugars, and said aqueous sugar coating substantially lacking solids.

2. The aqueous sugar coating of the above clause 1 comprising a pH of between about 1.7 and about 3.3.

3. The aqueous sugar coating according to any preceding clause comprising a water activity of less than 0.9.

4. The aqueous sugar coating according to any preceding clause comprising a viscosity of between about 170.0 cP and about 650.0 cP.

5. The aqueous sugar coating according to any preceding clause comprising at least one of: about 30% to about 32% water, about 1% to about 2% juice concentrate, about 3% to about 4% salt, and about 54% to about 73% sugar.

6. The aqueous sugar coating according to any preceding clause consisting of water, the juice concentrate, salt, and the sugar.

7. A method for making an aqueous sugar coating comprising the steps of:
sequentially combining aqueous sugar components in the following order: water, a juice concentrate, salt, and a sugar, wherein the sugar lacks cornstarch; and
dissolving the aqueous sugar components to form an aqueous sugar coating substantially lacking solids, and said aqueous sugar coating comprising at least 60% sugar and a juice concentrate, wherein said aqueous sugar coating comprises at least 68° Brix and greater than about 16.5% reducing sugars, wherein said aqueous sugar coating maintains its form as a liquid substantially lacking solids at room temperatures.

8. The method according to clause 7 wherein the dissolving step comprises heating.

9. The method according to any of clauses 7 or 8 wherein the aqueous sugar components are heated and mixed for less than about 30 minutes.

10. The method according to any of clauses 7 to 9 wherein the method comprises a step of mixing the aqueous sugar components at about 60 Hz.

11. The method according to any of clauses 7 to 10 wherein the dissolving step is completed before reaching a boiling point of the aqueous sugar coating.

12. The method according to any of clauses 7 to 11 wherein the dissolving step is performed at a temperature of between about 135° F. to about 145° F.

13. The method according to any of clauses 7 to 12 wherein the dissolving step is performed under vacuum at a pressure of about 3.5 psi.

14. A glazed baked snack food product comprising grain, said baked food product coated on a surface with a sugar coating comprising a juice concentrate and at least 60% sugar, the sugar comprising at least about 16.5% reducing sugars and lacking cornstarch, wherein said glazed baked snack food product comprises a moisture content of between about 2% to about 10%.

15. The glazed baked snack food product according to clause 14 comprising a moisture content of between about 2% to about 3.5%.

16. The glazed baked snack food product according to clause 14 or 15 comprising at least 5% of the sugar coating on a top surface.

17. The glazed baked snack food product according to any of clauses 14 to 16 comprising a pH of between about 5.0 to about 7.0.

18. The glazed baked snack food product according of any of clauses 14 to 17 comprising a hardness factor of between about 3.5 and about 8.0 kg.

What is claimed is:

1. A method for making an aqueous sugar coating comprising the steps of:
   sequentially combining aqueous sugar components in the following order: water, a juice concentrate, salt, and a sugar, wherein the sugar lacks cornstarch; and
   dissolving the aqueous sugar components to form an aqueous sugar coating substantially lacking solids, said aqueous sugar coating consisting of water, salt, at least 60% sugar, and about 1% to about 2% of a juice concentrate, wherein said aqueous sugar coating comprises at least 68° Brix and greater than about 16.5% reducing sugars, and wherein said aqueous sugar coating maintains its form as a liquid substantially lacking solids, wherein said aqueous sugar coating maintains its form as a liquid substantially lacking solids at room temperatures.

2. The method of claim 1 wherein the aqueous sugar components are combined in a heating apparatus and the dissolving step comprises heating.

3. The method of claim 2 wherein the aqueous sugar components are heated while mixing for less than about 30 minutes.

4. The method of claim 1 wherein the method comprises a step of mixing the aqueous sugar components at about 60 Hz.

5. The method of claim 1 wherein the dissolving step is completed before reaching a boiling point of the aqueous sugar coating.

6. The method of claim 1 wherein the dissolving step is performed at a temperature of between about 135° F. to about 145° F.

7. The method of claim 1 wherein the dissolving step is performed under vacuum at a pressure of about 3.5 psi.

8. The method of claim 1 wherein the method comprises a step of mixing the aqueous sugar components using an agitator in a figure 8-type blending action.

9. The method of claim 7 wherein the dissolving step comprises setting a vacuum to about 3.5 psi; heating the aqueous sugar components until reaching about 140° F.; and turning off the vacuum.

10. The method of claim 2 wherein the heating apparatus is a steam jacket kettle.

* * * * *